350-385 SR
XR 3,438,005
REFERENCE ROOM

WORD ORGANIZED OPTICAL MEMORY

Filed March 8, 1965

INVENTOR
W. J. TABOR
BY Herbert M. Shapiro
ATTORNEY

3438005
OR IN 365/127

April 8, 1969 W. J. TABOR 3,438,005

WORD ORGANIZED OPTICAL MEMORY

Filed March 8, 1965 Sheet 2 of 2

United States Patent Office 3,438,005
Patented Apr. 8, 1969

3,438,005
WORD ORGANIZED OPTICAL MEMORY

William J. Tabor, Murray Hill, N.J., assignor to Bell Telephone Laboratories, Incorporated, New York, N.Y., a corporation of New York

Filed Mar. 8, 1965, Ser. No. 437,769
Int. Cl. G11b *7/00;* G02f *1/00*
U.S. Cl. 340—173 6 Claims

ABSTRACT OF THE DISCLOSURE

A multistage digital light deflector operated in a mode where all light emanating from an output end is passed through a memory plane and reflected back through the deflector for detection is said to be operated in a reflective mode. A deflector operated in a reflective mode is adapted herein to a word-organized memory arrangement by routing a plurality of beams in parallel through the deflector to access simultaneously a pattern of obstructions on the memory plane. The pattern of obstructions defines a binary word.

This invention relates to signal translating systems and, more particularly, to deflection systems employing electromagnetic wave radiation, typically light.

Light deflection systems, employed, for example, for accessing memories, typically comprise a source of a beam of light and a digital multistage light deflector for routing that beam to a selected output position in response to a particular combination of inputs to the stages thereof. The bit location of the memory corresponding to that selected position, accordingly, is accessed by the beam, and the presence or absence of an obstruction in the accessed location is registered by the absence or presence, respectively, of the beam at a detector adjacent the memory.

This arrangement, of course, is bit organized. Word organization, however, is frequently desirable. The latter is achieved by directing light in the output position of the light deflector to the corresponding bit location on each of a plurality of memory media. Typically, these "media" are formed on one memory plane as shown in "Large-Capacity Memory Techniques for Computing Systems," edited by Yovits, page 79 et seq. The "fanout" of light from a selected output position of a deflector to a plurality of corresponding bit locations on different memory media is frequently termed "paralleling." The apparatus for achieving the fanout is conveniently termed a "multiple channel arrangement."

It has been found recently that a marked improvement in signal-to-noise ratio is achieved by reflecting light back through a memory plane, back through the light deflector to a detector positioned near the source of the light beam. The reverse path may be thought of as a "mirror image" of the forward transmission path and it is so designated herein. This arrangement, termed a "reflective-type light deflection system" is incompatible with the described multiple channel arrangement. The reason for this is that a reflective-type light deflection system typically includes mirrors next adjacent the memory medium. If a multiple channel arrangement is used to divide the light in a selected output poistion of a deflector, mirrors next adjacent the memory media merely reconstitute the divided light, upon reflection thereby, into a single beam at that position for retraversing the forward transmission path of the light. The information in the several bit locations is lost when that beam is reconstituted. Reflective-type light deflection systems, consequently, are presently operable only on a bit-organized basis.

An object of this invention is to provide a reflective-type light deflection system operable on a word-organized basis.

The above and further objects of this invention are realized in one embedominet thereof wherein a plurality of spaced apart input beams are routed simultaneously through a deflector to a given output position. Information is stored in the memory medium in such a manner that the plural beams in a given output position interrogate a corresponding number of bit locations comprising a binary word. A mirror next adjacent the memory plane reflects light back through the deflector to a corresponding number of detectors where the presence and absence of obstructions in corresponding bit locations are registered by the absence and presence, respectively, of light incident to the corresponding detectors.

Transmitting plural accessing beams through an entire deflection system rather than later dividing a single accessing beam at the output thereof is believed a departure from prior art teaching. The invention is based to a large extent on an appreciation that there need not be a one-to-one correspondence between each bit location on a memory medium and each output position in the light deflector as is the case where fanout is employed to provide word organization. Rather, the accessed bit locations may be reorganized to bear to one another a relationship corresponding to the spaced apart (or angular) relationship between a plurality of input beams. Essentially, an area is accessed; within that area the number of bit locations accessed corresponds to the number of beams directed to the area.

Accordingly, a feature of this invention is a new and novel reflective-type light deflection system including a source of spaced apart light beams for effecting operation on a word-organized basis.

The plural input, in the described illustrative embodiment, is provided conveniently from a single input beam by the early stages of a light deflector wherein the input light is transmitted equally in all the paths to provide the required plural input to a later stage of the deflector separated from the earlier stages by a beam splitter.

The invention and the various objects and features thereof will be understood more fully from a consideration of the following detailed discussion rendered in conjunction with the accompanying drawing, wherein.

Figure 1:
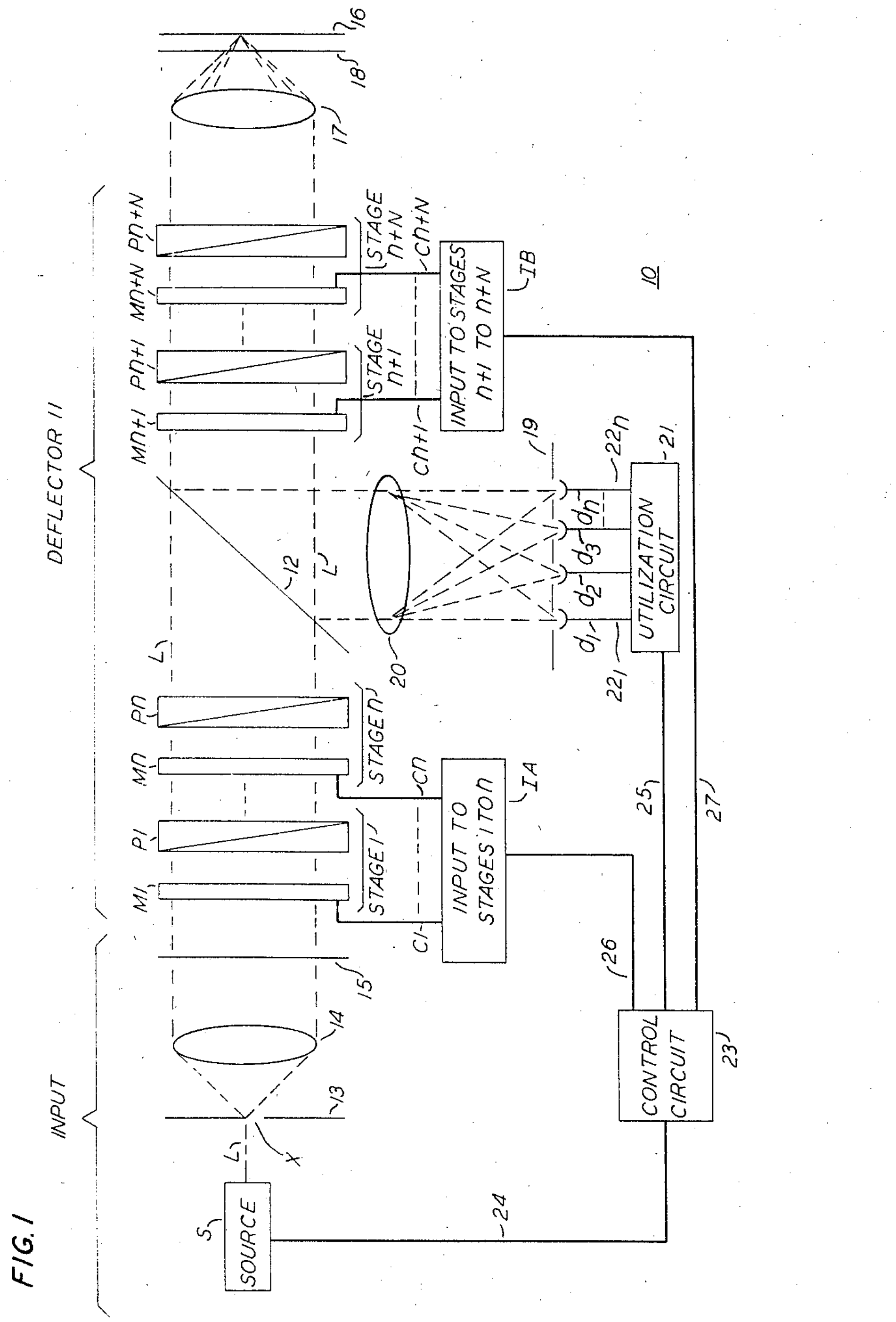
FIG. 1 is a schematic representation of a light deflection system in accordance with this invention.

Specifically, an illustrative light deflection system 10 in accordance with this invention is shown in FIG. 1. The system comprises a light deflector 11 including $n+N$ stages. Each stage includes a modulator designated M and a birefringent crystal such as, for example, a Wollaston prism designated P; each designation includes a reference corresponding to the stage in which the modulator and prism are positioned. A beam splitter 12 is positioned between stages $n$ and $n+1$. In this connection, a beam splitter is a partially silvered mirror, here half-silvered, for partially reflecting and partially transmitting light incident thereto.

A source of light S is positioned adjacent the first stage of the deflector separated therefrom by a plate 13 with an aperture X therein, a lens 14, and a polarizer 15. The source along with the apertured plate, the lens, and the polarizer may be thought of as the input to the deflector in the illustrative embodiment.

A mirror 16 is positioned adjacent the $n+N$th stage of the deflector separated therefrom by a lens 17 and a memory plane 18.

Photodetectors $d1 \ldots dn$ are positioned adjacent beam splitter 12. A plate 19, including apertures X1 . . . X$n$, is positioned between the detectors and the beam splitter 12 such that the apertures in plate 19 are aligned with the detectors bearing the corresponding designations. Plate 19 is separated from beam splitter 12 by a lens 20. Detectors $d1 \ldots dn$ are connected to a utilization circuit 21 via conductors $\mathbf{22_1} \ldots \mathbf{22_n}$, respectively. Stage input circuits IA and IB are shown connected to the stages (modulators in the stages) 1 to $n$, and $n+1$ to $n+N$, respectively, via separate conductors C. Each conductor designation includes a reference to the corresponding stage.

Source S, utilization circuit 21 and stage input circuits IA and IB are connected to a control circuit 23 via conductors 24, 25, 26 and 27, respectively.

In light of the foregoing organization, an illustrative operation may now be described. For this purpose, the number of stages positioned on the source side of beam splitter 12 will be assumed to be two. The description is presened in terms of an assumed binary word 1011 stored as the presence and absence of opaque spots in a representative word location on a photographic film which is the memory plane in the illustrative embodiment.

The presence of an opaque spot in an addressed bit location obstructs the passage of light in the corresponding path and the corresponding detector detects a null. Consequently, the presence of an opaque spot is taken to correspond to a stored binary "0." The absence of an opaque spot is taken to represent a "1." In this connection, opaque spots are developed on a photographic film by well known techniques. The illustrative system, however, is also capable of providing the opaque spots as is described hereinafter. Other types of obstructions such as those producing reflections, scattering, and wavelength changes are well known.

Source S directs, under the control of control circuit 23, a beam of light represented by the broken line designated L in FIG. 1. Beam L is transmitted through aperture X, through lens 14, through polarizer 15 into the first stage of the deflector. In this connection, the various sources, polarizers, input circuits, modulators, crystals, lenses, detectors, utilization circuits, and control circuits may be any such items capable of operating in accordance with this invention. Specifically, source S may be a well known optical maser.

In the illustrative system, Wollaston prisms are used in each stage of the deflector. Such prisms deflect incident light to one of two paths at an angle to one another, depending on the polarization of the incident light. The operation of Wollaston prisms, as well as other complex prisms such as Rochon and Senarmont prisms, in this connection is described in the Bell System Technical Journal, volume XLIII, No. 3, May 1964, pages 1153–1154.

In accordance with the present invention, the modulators of the first $n$ stages (assumed to be two stages) are controlled by input circuit IA under the control of control circuit 23 to pass light therethrough equally in two directions of polarization. Consequently, light emerges from the first stage of the deflector equally in each path. These two beams similarly emerge from the second stage as light in four paths (angles). Light in two of the paths is polarized in one direction. Light in the other two is polarized in the other direction. None of the paths is parallel to another.

These four beams of light pass through beam splitter 12 to the $n+1$th stage of the deflector. The modulator of that stage either rotates the polarization of light in all the paths or passes the light unrotated depending on the condition (1–0, or voltage-no voltage) of the input circuit to that stage as is well known. The Wollaston prism of that stage deflects the light with like polarization through like angles to corresponding nonparallel paths.

The light in the other nonparallel paths is deflected through a different angle. Analogous results are produced in the following stages depending on the various inputs to the stage. In this connection, it is to be understood that the deflectors in adjacent stages deflects light in directions orthogonal to one another. That is, if, for example, stage $n+1$ deflects light in a horizontal (or X) direction, the next adjacent stage deflects light in a vertical (Y) direction. Thus, the four light beams are routed to one of $2^N$ output positions in the memory plane. The term "output position" is herein defined to characterize the positions for the various beams of light corresponding to a given combination of stage inputs.

For simplicity, it is assumed that N, the number of stages on the output (memory plane) side of beam splitter 12, also is equal to two. Therefore, the four beams are routed to four different positions, each of these four positions being determined by the direction of polarization, the direction (assumed normal to the first stage) of the light at each stage, and the input to the modulator at each stage. If the absence and presence of an input to the modulator in each stage $n+1$ and $n+N$ are represented by "0" and "1," respectively, then 00 represents the absence of polarization rotation by those stages.

A 00 (0–0) input to the $n+1$th and Nth stages of the deflector is taken to correspond to the selected output position and the representative word location on the memory plane. The four bit locations of that word, accordingly, are designated "00" in FIG. 2. The positions of the bit locations are described hereinafter. For the assumed illustrative word 1011, the second bit location includes an opaque spot indicated by a blackened circle in FIG. 2. The remaining bit locations include unblackened circles representing the absence of opaque spots there. Light passes all but the second bit location to be deflected by mirror 16. The reflected light successfully retraverses theforward transmission paths essentially only in the path selected (the selected word). The reflected light is (partially) deflected by beam splitter 12 through converging lens 20 (FIG. 1) for transmission through the corresponding apertures in plate 19 to corresponding detectors $d$. In the illustrative embodiment there need be only four apertures in plate 19 and four detectors. Detector $d2$ registers a null; the remaining detectors register pulses. The presence and absence of pulses in the detectors is registered in utilization circuit 21 under the control of control circuit 23.

Figure 2:
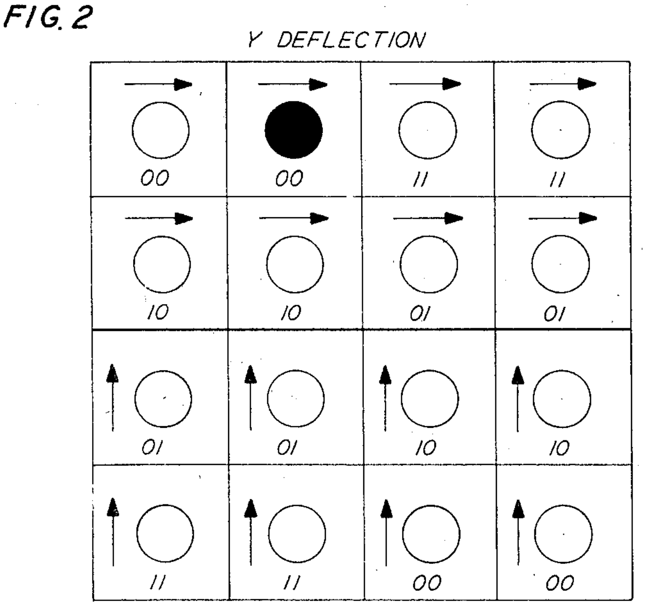
FIG. 2 is a schematic representation of a memory plane accessed by the system of FIG. 1.
Figure 3:
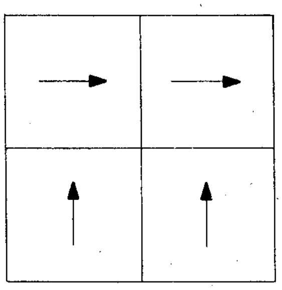
FIGS. 3 and 4 are schematic representations of beam positions at various stages in the deflector of FIG. 1.
Figure 4:
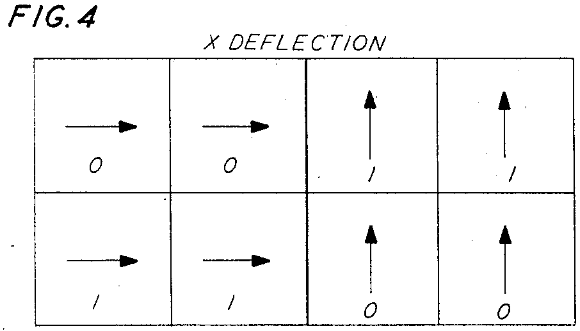

If the stages 1 through $n$ (stages 1 and 2) are assumed to produce light in four paths (angles) in two different polarization directions represented as shown in FIG. 3, then stage $n+1$ (stage 3) in response to a "0" or "1" input by the input circuit to that stage provides a pattern of four beams in one of two positions. This is clear from FIGS. 3 and 4 which show, simultaneously, all the beam positions at the $n+1$th and $n+N$th stages of the deflector. Whether a beam is present in any particular position depends on the input to the stage. As viewed in FIGS. 3 and 4, if the top two beams at the beam splitter have directions of polarization to the right as shown by the arrows in FIG. 3, and if the bottom two beams have directions upward as shown by the arrows there, after the stage $n+1$ the pattern of four beams on the left, as viewed in FIG. 4, all have directions of polarization to the right. The pattern of four to the right has directions of polarization upward. In this connection, it is helpful to remember that stage $n+1$ provides deflection in the X (horizontal) direction and that the polarization direction of light changes when the stage input is a "1." The directions of polarization are as shown by the arrows in FIG. 4. It is noted that the beams as represented by the arrows in the top row in FIG. 3, for a "0" input to stage $n+1$, pass to the two left positions in the top row of FIG. 4; for a "1" input, the beams represented by those arrows pass to the two right positions in the top row as shown there. The beams represented by the arrows in the bottom row of FIG. 3, for a "1" input to stage $n+1$, pass to the left two positions in the bottom row of FIG. 4; for a "0" input to that stage the beams in the bottom row pass to the right two positions there. Either of the sets of four beams, designated "0" and "1" as shown in FIG. 4, is selectively transmitted to either of two positions by the second stage ($N=2$) on the output side of the beam splitter, depending on the "0" or "1" condition of the input circuit to that stage. The resulting pattern is shown in FIG. 2. The polarization directions of the light beams in the positions corresponding to the top two rows of the figure are to the right as represented by the arrows there. Light in the positions corresponding to the bottom two rows is in a direction of polarization upward also as represented by arrows.

The 00, 01, 10, and 11 designations represent the possible combinations of inputs to the stages to the output side of the beam splitter for routing light to the so designated position. The representative word location provided in response to a 00 input code to stages $n+1$ and N includes the two bit locations in the top row on the left as viewed in FIG. 2. The remaining two of the four so addressed bit locations are in the bottom row on the right. For the assumed illustrative word 1011, the second bit location in the top row on the left includes the opaque spot as illustrated. The word location corresponding to input combination 01 includes the two locations to the right of the second row of FIG. 2 and the two to the left of row three; that corresponding to 10 includes the two to the left in row two and to the right in row three. The word location corresponding to 11 includes the two to the right in row one and the two to the left in row four. The rows are numbered from top to bottom as viewed in the figure. The pattern of information accessed by the set of four beams in the illustrative embodiment, accordingly, is different for different combinations of inputs to the stage $n+1$ and $n+N$.

FIGS. 2, 3, and 4, it is to be clear, are representations of different light beams (along different paths or angles) as viewed in FIG. 1 looking from right to left along the axis of the deflector at the output of the represented stage.

The system described operates as a read only memory. For such memories, the modulators in the stages on the source side of beam splitter 12 are set to rotate half of the incident polarized light to a different direction of polarization (viz. circular polarization). It is known, however, that a Wollaston prism may be oriented with respect to incident light to pass that light therethrough equally in two different paths (angles). Therefore, for read only memories, the modulators of these stages may be replaced by fixed quarter wave plates of, for example, mica. Alternatively, the modulators may be omitted and the Wollaston prisms reoriented to permit the division of input light equally amongst all possible paths (angles).

On the other hand, a light deflection system, in accordance with this invention, may be operated to write information into the memory plane as well as to read information stored there by other means. In this connection, a modulator is included in each stage on the source side of the beam splitter. Moreover, each of these modulators is set to the "0" or "1" position to permit passage of input light to essentially only one of two positions at each stage. Thus, during writing, in accordance with this invention, light in essentially only one path (angle) passes beam splitter 12, and that light is transmitted to only one bit location on the memory plane in response to the inputs to the stages on the output side of the beam deflector. To write, in accordance with the assumed illustrative operation, the word 1011, the source is pulsed under the control of control circuit 23 to provide light only when the inputs to the stages 1 through $n+N$ correspond to the second bit location of the representative word location. In this manner, an undeveloped photographic film is selectively exposed to provide an opaque spot to obstruct light in the corresponding path in a later read operation.

It might be appreciated that it is particularly advantageous to write into an undeveloped photographic film in accordance with this invention. In this manner, a later read operation is unencumbered by registration problems, particularly those due to different patterns of information, when information is stored by other means.

It is to be understood that successive stages in a light deflector, as disclosed in the above mentioned Bell System Technical Journal article provide successively greater displacement of paths. That is to say, successive stages provide successively greater angular deflection. Accordingly, when a plurality of input beams are provided, in accordance with this invention, the first stage of the deflector is designed to provide sufficient angular deflection to avoid ambiguous outputs due to interrogation of particular bit locations for different stage input settings. For example, if a deflector suitable for deflecting a single input beam were provided with a multiple beam input, certain bit locations on a corresponding memory medium would be addressed for each of several different stage input settings. To avoid this, one (or more) stage of that deflector (two stages for the illustrated system) is omitted or the input to the otherwise omitted stage (or stages) is programmed to permit passage of light therethrough only along one path (or at one angle). Alternatively, a deflector is designed with the first stage (and successive stages) providing twice the angular deflection provided by the first stage (and successive stages) of conventional deflector adapted for deflecting a single input beam, maintaining a corresponding concentration of bit locations.

The stages on the source side of beam splitter 12 may be omitted, and, illustratively, four spaced apart (or angularly displaced) beams, for example, of like polarization, may be provided by conventional means. Information then may be stored in like patterns of four similarly spaced apart bit locations in $2^N$ positions of the memory plane. Alternatively, a single broad input beam may be used in accordance with this invention. In this instance, the diameter of the beam image on a memory medium is chosen to encompass the several bit locations accessed for each combination of stage input settings. The presence and absence of obstructions in the so addressed locations effectively divide the single beam into a number of discrete beams for detection by a like number of detectors. Operation is entirely analogous to plural input operation.

What have been described here are considered to be only illustrative embodiments of this invention, and it is to be understood that numerous other arrangements may be devised by one skilled in the art without departing from the spirit and scope thereof.

What is claimed is:

1. A word-organized memory comprising a source of essentially a plurality of spaced apart input beams of polarized light, a first multistage digital light deflector wherein the disposition of light transmitted therethrough is determined responsive to a voltage code impressed across the various stages therein, said deflector having input and output ends and being disposed in the optical path of said beams, a memory medium disposed in the path of said beams, said medium having the presence and absence of obstructions to light therein, said presence and absence of obstructions being spaced apart in a geometry to correspond to the disposition of said spaced apart input beams, a mirror for reflecting back into the output end of said deflector all light passed by said memory medium while the voltage code is maintained, and means separating the reflected beams from said input beams.

2. A word-organized memory in accordance with claim 1 including means detecting severally the reflected beams emanating from said input end of said deflector.

3. A word-organized memory in accordance with claim 2 wherein said source of a plurality of spaced apart beams of polarized light comprises a source of a single beam of polarized light and a second multistage digital light deflector for routing said beam into a plurality of paths.

4. A word-organized memory in accordance with claim 3 wherein each stage in said deflectors include a Wollaston prism for providing spaced apart beams by angular deflection of said beam.

5. A word-organized memory in accordance with claim 2 wherein said source of a plurality of spaced apart beams of polarized light comprises a source of a single beam of polarized light and means for dividing said beam into a plurality of spaced apart beams, said last-mentioned means comprising a succession of stages, each of said stages including a birefringent crystal each oriented to pass light therethrough equally in each of two paths.

6. A word-organized memory in accordance with claim 2 wherein said source of a plurality of spaced apart beams of polarized light comprises a source of a single beam of polarized light and means for dividing said beam into a plurality of spaced apart beams, said last-mentioned means comprising a succession of stages each including a polarization modulator and a birefringent crystal, and means for setting each of said modulators in a condition for rotating the direction of polarization of half the number of beams emanating from the birefringent crystal at each stage.

References Cited

UNITED STATES PATENTS 3,144,807 8/1964 Coombs ____________ 350—285

FOREIGN PATENTS 675,357 7/1952 Great Britain.

OTHER REFERENCES

Barber: Control Engineering, October 1963, pp. 82–86 (copy in 250/219 ID).

DAVID SCHONBERG, *Primary Examiner.*

RONALD J. STERN, *Assistant Examiner.*

U.S. Cl. X.R.

250—219; 350—150